(12) United States Patent
Eader

(10) Patent No.: US 7,798,431 B2
(45) Date of Patent: Sep. 21, 2010

(54) FLOW CONTROL DEVICE

(76) Inventor: Christopher J. Eader, 931 Ave., Coronado, CA (US) 92118

( * ) Notice: Subject to any disclaimer, the term of this patent is extended or adjusted under 35 U.S.C. 154(b) by 303 days.

(21) Appl. No.: 11/520,207

(22) Filed: Sep. 12, 2006

(65) Prior Publication Data

US 2007/0095951 A1  May 3, 2007

Related U.S. Application Data

(60) Provisional application No. 60/729,493, filed on Oct. 24, 2005.

(51) Int. Cl.
- A01G 25/06 (2006.01)
- B05B 15/06 (2006.01)
- B05B 1/30 (2006.01)
- B05B 1/34 (2006.01)
- F16K 17/14 (2006.01)
- F16K 17/40 (2006.01)

(52) U.S. Cl. .................. 239/572; 239/201; 239/533.15; 239/570; 137/68.14

(58) Field of Classification Search .............. 239/201, 239/533.15, 570, 572; 137/68.14, 68.15, 137/68.16, 71, 511, 516.25, 519.5
See application file for complete search history.

(56) References Cited

U.S. PATENT DOCUMENTS

| | | | | |
|---|---|---|---|---|
| 733,372 | A * | 7/1903 | Colwell | 137/71 |
| 2,607,225 | A * | 8/1952 | Biscoe | 73/323 |
| 4,108,439 | A * | 8/1978 | McGuire | 473/150 |
| 4,161,292 | A | 7/1979 | Holloway et al. | |
| 4,227,648 | A | 10/1980 | Holloway et al. | |
| 4,944,327 | A | 7/1990 | Gyben | |
| 5,174,500 | A | 12/1992 | Yianilos | |
| 5,335,857 | A * | 8/1994 | Hagon | 239/204 |
| 5,609,179 | A | 3/1997 | Knapp | |
| 6,000,632 | A * | 12/1999 | Wallace | 239/204 |
| 6,199,584 | B1 * | 3/2001 | Brown et al. | 137/519.5 |
| 6,234,018 | B1 * | 5/2001 | Kelada | 73/323 |
| 6,260,575 | B1 | 7/2001 | Brown et al. | |
| 6,263,911 | B1 | 7/2001 | Brown et al. | |
| 6,263,912 | B1 | 7/2001 | Brown et al. | |
| 7,025,325 | B2 | 4/2006 | Kwon | |
| 2005/0098662 | A1 | 5/2005 | Magi et al. | |

FOREIGN PATENT DOCUMENTS

| AU | 48349 | 10/1972 |
|---|---|---|
| FR | 2160068 | 5/1973 |

\* cited by examiner

Primary Examiner—Dinh Q Nguyen
Assistant Examiner—Ryan Reis
(74) Attorney, Agent, or Firm—Fish & Richardson P.C.

(57) ABSTRACT

A flow control device can be implemented to include an riser, a control valve, a simplified retaining rod, and a ball. The riser can include multiple threaded segments, one or more predetermined breakaway points, and a predetermined length and diameter. The control valve can include a first threaded valve end for detachably connecting to the riser, a second threaded valve end for detachably connecting to a supply line, and a ball housing integrally connected to the first and second valve ends. The ball housing has a predetermined internal housing diameter. The ball is enveloped inside the ball housing, and the ball diameter is smaller than the internal housing diameter and larger than a first opening between the first valve end and the ball housing and a second opening between the second valve end and the ball housing. The retaining rod physically prevents the ball from obstructing the first opening.

29 Claims, 9 Drawing Sheets

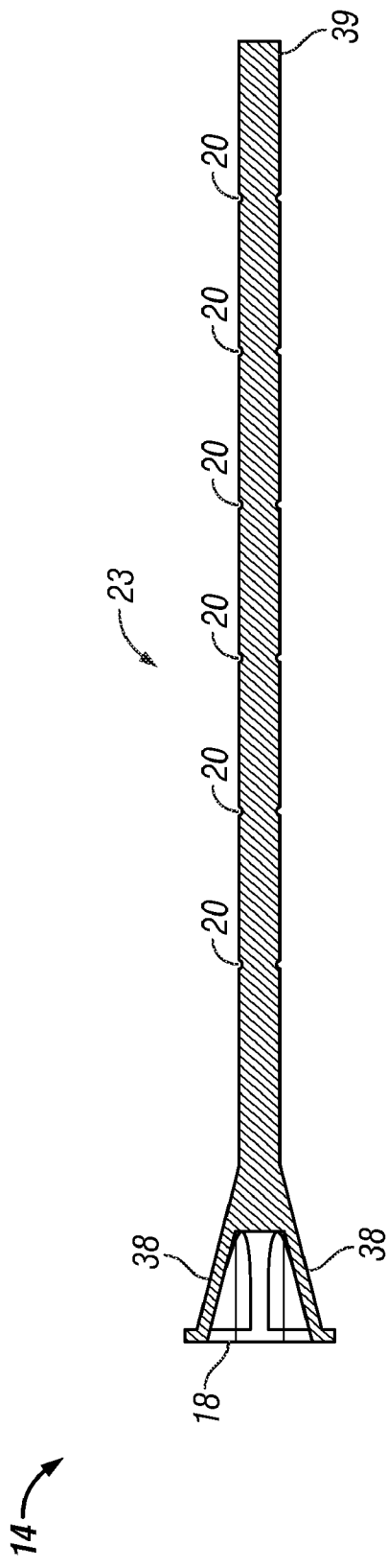
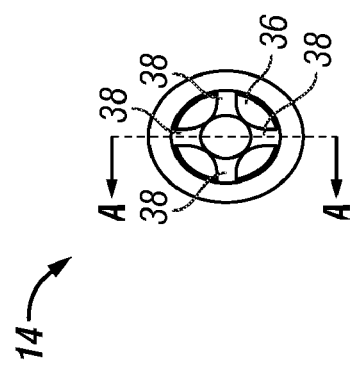
FIG. 3A
FIG. 3B

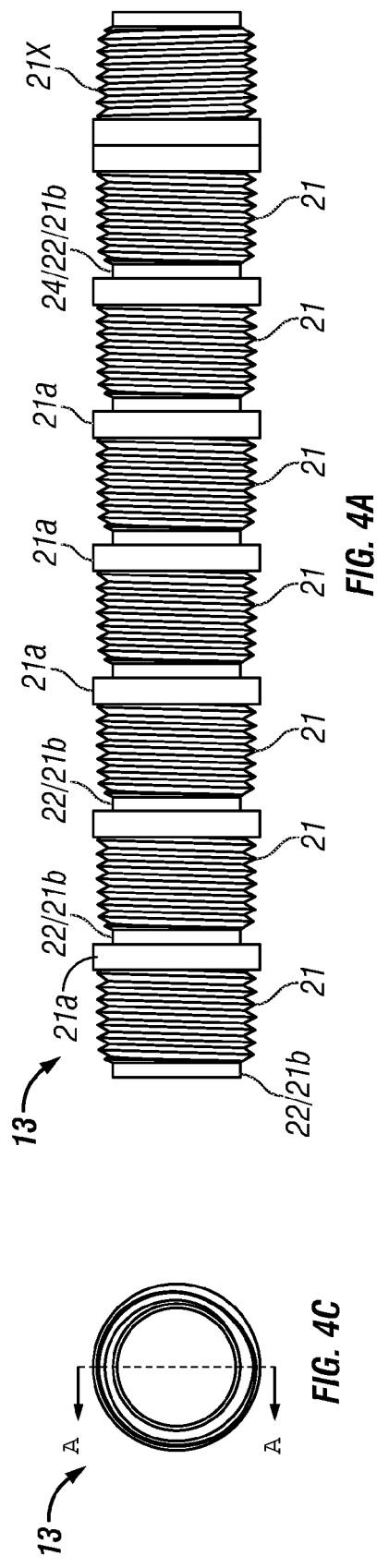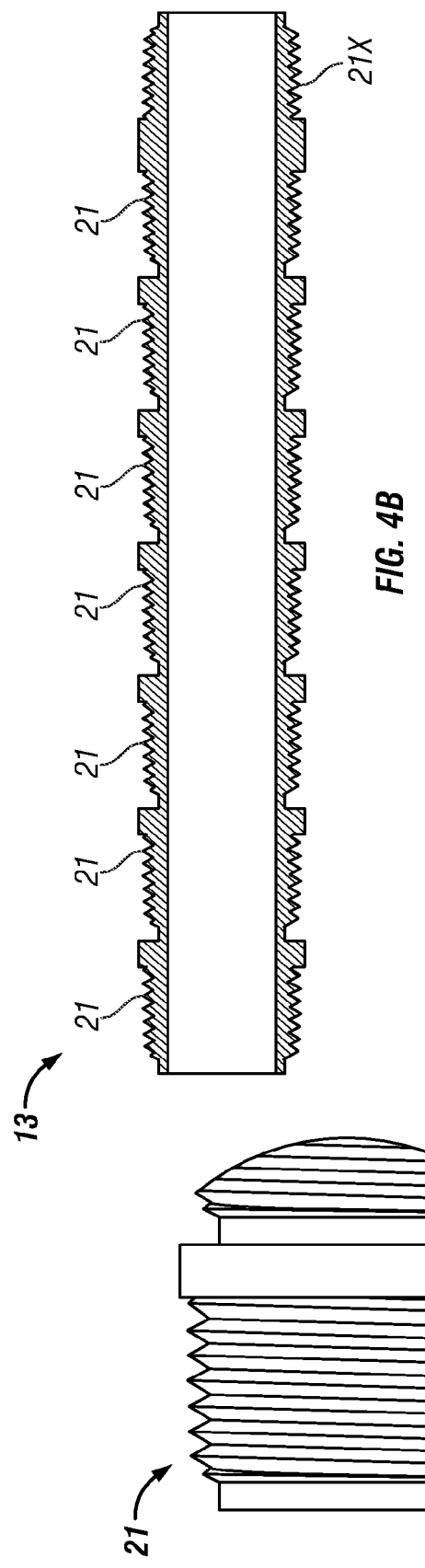
FIG. 4A
FIG. 4B
FIG. 4C
FIG. 4D

FLOW CONTROL DEVICE

RELATED APPLICATIONS

This application claims the benefit of the filing date of U.S. Provisional Application No. 60/729,493, filed Oct. 24, 2005, which is incorporated herein by reference.

BACKGROUND

The subject matter described herein relates to flow control devices, such as fluid flow control devices for use in irrigation, fire sprinkler, fire hydrant, or petroleum distribution or dispensing systems, as well as gaseous flow control devices Fluid distribution and dispensing systems, such as irrigation, fire sprinkler, and fire hydrant systems, facilitate the distribution of fluids, such as water, to desired locations at desired times. Irrigation systems, for example, provide needed water to grass, plants, or animals, while fire sprinkler and fire hydrant systems typically provide needed fluids to dose fires. These fluid distribution and dispensing systems may incorporate flow control devices which control the flow of fluids in the system.

A fluid flow control device may employ one or more control valves and one or more flow control devices. The upstream end of the fluid flow control device is typically connected to the supply line(s), usually at a "T" or elbow junction, and the downstream end of the fluid control device is typically connected to one or more sprinkler heads, such as in irrigation and fire sprinkler systems. In particular, the upstream end of the control valve is usually connected to the supply line(s), the upstream end of the flow control device is connected to the downstream end of the control valve, and the downstream end of the flow control device is connected to the sprinkler head(s). The supply lines, fluid flow control device, and sprinkler heads are commonly made of plastic, such as polyvinyl chloride (PVC), copper, brass or galvanized steel or some other corrosion resistant material. Moreover, each component (e.g., the supply lines, control valve, flow control device, and sprinkler head) may be made of a material different from the other components in the system.

The flow control device in conventional flow control devices is often implemented to extend the sprinkler head from the supply line, such as above the supply line in a below the ground or on the ground irrigation system, or below the supply line in an above the ground fire sprinkler system, which is typically used in new construction of office, industrial, and residential buildings.

While the flow control device-mounted sprinkler head enlarges the area irrigated by the sprinkler, the flow control device and sprinkler head are susceptible to being broken or stolen since they are exposed. In such an event, because the control valves that are used in many conventional flow control devices are not appropriate for automatically restricting the flow of fluids when a breakage occurs or the sprinkler head is stolen or damaged, fluids cannot be properly distributed as the rate of fluid flow increases without the restricting back pressure provided by the sprinkler head. As a result, fluid flows freely and abundantly, which may damage the intended and unintended irrigation area. Moreover, a significant amount of fluids can be wasted as the result of the unrestricted flow of fluids.

Some conventional flow control devices have employed automatic control valves, such as those described in U.S. Pat. No. 6,199,584, that automatically restrict the flow of fluids when a breakage occurs or the sprinkler head is stolen or damaged.

SUMMARY

The present inventors recognized that conventional flow control devices, such as those with automatic control valves, tend to be overly complex in design and thus costly to make and implement, which in a fluid distribution and dispensing system that employs hundreds or thousands of flow control device-mounted sprinklers can be cost prohibitive. The present inventors also recognized that these conventional flow control devices often are unreliable and fail to stop or even slow the rate of fluid flow when a failure occurs (such as flow control device being broken or the sprinkler head being damaged or stolen). Moreover, the present inventors recognized that conventional flow control devices were made of a color that was often difficult to detect, especially when a breakage occurs or the sprinkler head is stolen or damaged. Consequently, the present inventors developed the subject matter described herein, e.g., apparatus and techniques for controlling gas flow and fluid flow, such as water or gasoline, that can be implemented or used in a fluid distribution systems, such as an irrigation system, a fire sprinkler system, a fire hydrant, and gasoline dispenser systems that are in prevalent use at gasoline stations.

In one aspect, a flow control device includes a riser having a first end and a second end, wherein between the first end and the second end are disposed threaded segments, each segment having a top, a base, a predetermined inner diameter and a predetermined outer diameter, wherein the predetermined inner diameter is substantially the same from the base of the threaded segment to the top of the threaded segment, and the predetermined outer diameter is wider at the base of the threaded segment than at the top of the threaded segment, further wherein the threaded segments, together, form a length of the riser. The flow control device also includes a control valve having a first threaded valve end for detachably connecting to the first end of the riser, a second threaded valve end for detachably connecting to a supply line, and a ball housing between the first threaded valve end and the second threaded valve end, wherein the ball housing has a predetermined inner housing diameter. The flow control device further includes a ball enveloped inside the ball housing, wherein the ball has a diameter smaller than the predetermined inner housing diameter and larger than a first opening between the first threaded valve end and the ball housing and a second opening between the second threaded end and the ball housing. The flow control device additionally includes a retaining rod having a first end, a body having predetermined cut-off points spaced between a first body end and a second body end of the body for adjusting a length of the retaining rod, connecting members wherein each connecting member has a first connecting member end and a second connecting member end, and a second end having an opening, wherein the first end is connected to the first body end, the second body end is connected to each first connecting member end, and each second connecting member end is connected to the second end. The first end of the retaining rod is configured to be disposed inside the ball housing, a portion of the body of the retaining rod and the connecting members are configured to be disposed inside the riser, and the second end of the retaining rod is configured to be disposed on the second end of the riser so as to physically prevent the ball from obstructing the first opening.

In one variation, the riser of the flow control device may be configured to break at the predetermined cut-off points under a force insufficient to break any other point of the riser. Further more, in another variation, the first end of the retaining rod may have a first end diameter that is smaller than the predetermined inner housing diameter and the first and second openings; and the second end of the retaining rod may have a second end diameter that is greater than the predetermined inner diameter of the riser. In another variation, the second end of the riser may be configured to be detachably connected to one or more particle dispensers, and the particle dispensers may be configured to stabilize the retaining rod inside the riser when connected to the second end of the riser. The particle dispensers may be a sprinkler head, a fire sprinkler head, a gas pump and/or a fire hydrant. In yet another variation, the ball housing may be configured to allow the ball to freely move inside the ball housing.

In another variation, the second threaded valve end may be detachably connected to a fluid supply line so that during operation fluid flows from the fluid supply line into the ball housing and causes the ball to obstruct the first opening when the retaining rod is in a broken state or absent from the riser. The ball obstructing the first opening prevents fluid flow through the first opening. Additionally, the second threaded valve end may be detachably connected to a gas supply line so that during operation gas flows from the gas supply line into the ball housing and causes the ball to obstruct the first opening when the retaining rod is in a broken state or absent from the riser. In this case, the ball obstructing the first opening prevents gas flow through the first opening.

The riser, the control valve, the retaining rod, and the ball may be composed of one or more materials, and at least one of these components may be composed of a material different from the others, or they all may be made of the same material. The material may be plastic or non-plastic, and may be compliant to a code or a regulation. Plastic materials may include polyvinyl chloride (PVC), chlorinated polyvinyl chloride (CPVC), crosslinked polyethylene plastic (PEX), and acrylonitrile butadiene styrene (ABS). Additionally, in one variation, the riser may be made of a color so as to permit ease of detection, such as orange, yellow or purple.

In an interrelated aspect, a technique is disclosed for automatically controlling particle flow through from a supply line through an opening using a flow control device, wherein the flow control device has a control valve with a first threaded valve end detachably connected to the supply line and a second threaded valve end, a riser having an upstream end detachably connected to the second threaded valve end and a downstream end, a retaining rod positioned within the riser with a first end positioned in a ball housing of the control valve and a second end mechanically engaged between the downstream end of the riser and a particle dispenser, further wherein the ball housing is integrally connected between the first threaded valve end and the second threaded valve end of the control valve and has a predetermined internal housing diameter, further wherein the ball housing encapsulates a ball having a ball diameter smaller than the internal housing diameter and larger than a first opening between the first threaded valve end and the ball housing and a second opening between the second threaded valve end and the ball housing. The technique includes the following steps. First, a particle flow is generated. Then, the generated particle is received at the first threaded valve end of the control valve. Next, the received particle flow is permitted to pass through the second threaded valve end of the control valve during a normal operation, or the received particle flow is automatically stopped from passing through the second threaded valve end of the control valve during an abnormal operation. The abnormal operation may occur when the retaining rod is broken or absent. Optionally, the backflow of particles from the riser into the supply line may be prevented by applying the ball in the ball housing against the first opening of the control valve.

In one variation of permitting the received particle flow to pass through the second threaded valve end of the control valve during a normal operation, the ball in the ball housing is moved away from the first opening of the control valve towards the second opening of the control valve, and the ball is prevented from obstructing the second opening of the control valve. Preventing the ball from obstructing the second opening of the control valve may include mechanically engaging the second end of the retaining rod between the downstream end of the riser and the particle dispenser so that the first end of the retaining rod remains rigidly within the ball housing of the control valve, and obstructing the ball towards the second opening of the control valve with the first end of the retaining rod. In one variation of automatically stopping the received particle flow from passing through the second threaded valve end of the control valve during an abnormal operation, the ball in the ball housing is moved against the second opening of the control valve.

In one variation of the flow control device used in the disclosed technique, the riser may additionally include cutoff points for adjusting the predetermined length. Moreover, in the flow control device, the retaining rode may include cutoff points for adjusting a length of the retaining rod, a first rod end having a first rod diameter that is less than the predetermined inner diameter of the riser, the internal housing diameter and the first and second openings, and a second rod end having a second rod diameter that is greater than the predetermined inner diameter. In another variation of the flow control device used in the disclosed technique, the particle dispenser may be a sprinkler head, a fire sprinkler head, a gas pump or a fire hydrant. Additionally, the riser and retaining rod may be configured to breakaway at the one or more breakaway points under a force insufficient to break the rest of the flow control device.

The subject matter described herein may provide one or more of the following advantages. In operation, when a force is exerted on the flow control device that is sufficient to break the flow control device at the predetermined breakaway point, the force of the flow of fluid (or gas) pushes the ball against the retaining rod. As a result, due to the separation of the flow control device at the breakaway point the, ball will be forced into or against a recess in the control valve and the water flow out of the control valve into the riser is prevented even though fluids (or gas) are still being provided in the supply line. Thus, the potential damage from a free flowing stream of fluids, for example, out of the broken riser or missing sprinkler head is reduced or eliminated. Further, stopping the free flow of irrigation water from a broken sprinkler head or flow control device may reduce water waste. The breakaway point of the flow control device is designed such that the flow control device may break with less force than a sprinkler head. This feature may prevent damage to the sprinkler head and also allows the flow control device shut off valve to become engaged. Moreover, because the subject matter disclosed here stops the free flow of particles through the broken valve, the pressure in the rest of the system is still maintained, allowing normal flow of particles to the remaining properly operating particle dispensers.

The details of one or more implementations of the subject matter are set forth in the accompanying drawings and the description below. Other features and advantages will be apparent from the description and drawings, and from the claims.

DESCRIPTION OF DRAWINGS

FIGS. 3A and 3B illustrate a side view and top view, respectively, of a retaining rod.

FIGS. 4A-D depict various views of an externally threaded riser of a flow control device.

Like reference symbols in the various drawings indicate like elements.

DETAILED DESCRIPTION

Figure 1:
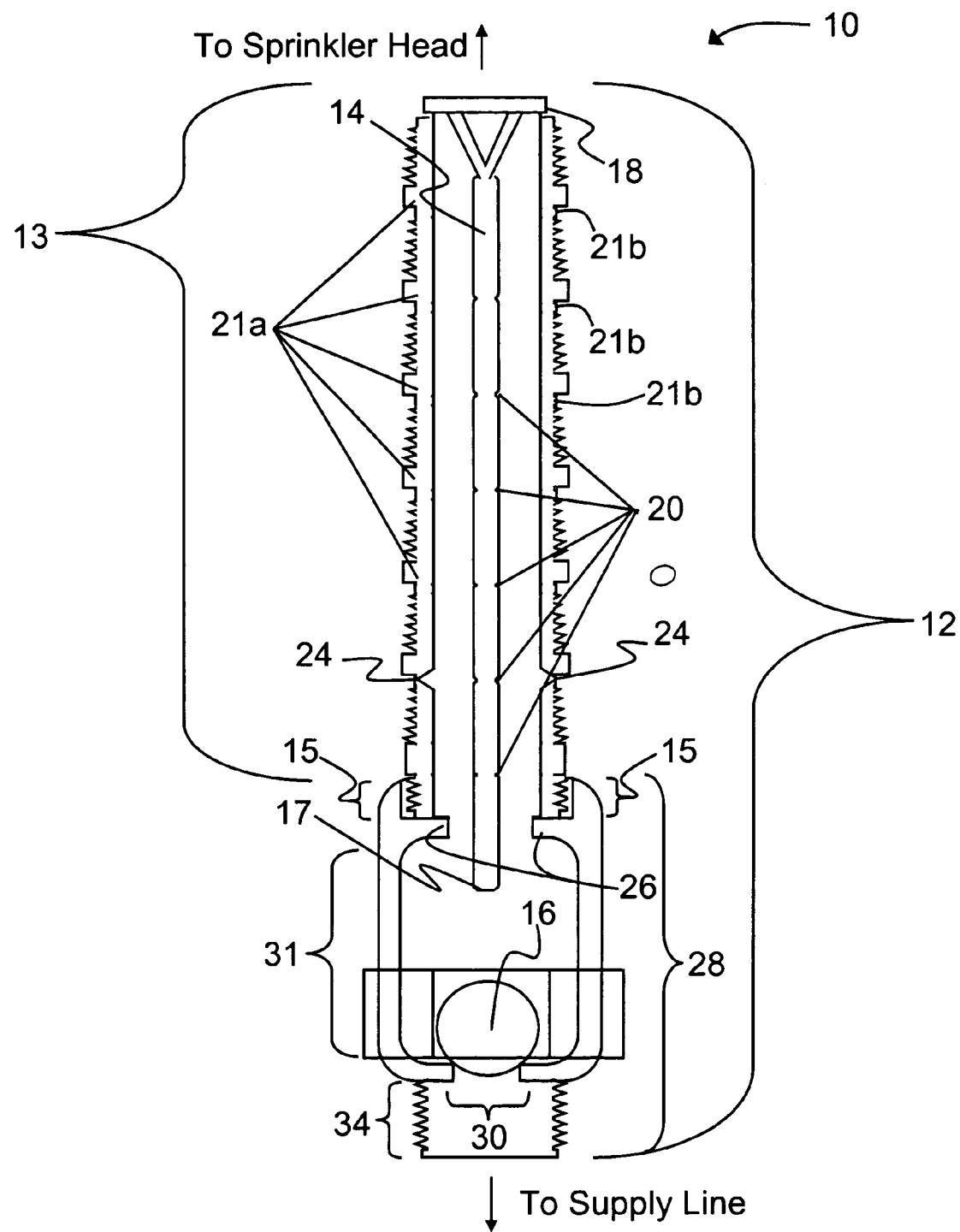
FIG. 1 illustrates a cross-sectional view of a flow control device.

FIG. 1 illustrates a cross-sectional view of a flow control device 10, which may be used for controlling the flow of fluid, such as water, in an irrigation system. The flow control device 10 comprises a control valve 28, a riser 13 and a retaining rod 14. All components of the flow control device 10 are made of plastic, such as PVC. Alternatively, the components of the control device 10 can all, or individually, be may made of different materials, such as other types of plastics (e.g., chlorinated polyvinyl chloride [CPVC], polypropolyene, cross-linked polyethylene plastic [PEX], and Acrylonitrile Butadiene Styrene [ABS]) and non-plastic materials, such as copper, brass, galvanized steel, chrome, nickel, and other metal alloys, or those materials complying with codes and regulations for fluid, gas and other particle distribution systems. The control valve 28 and the riser 13, which in this implementation, are separate and distinct components, together, form the flow control device body 12.

The control valve 28 includes a ball housing 31, a ball 16 a first threaded end 15, a second threaded end 34, a first valve recess 26 and a second valve recess 30.

The second valve recess 30 is an opening in the upstream end of the control valve 28 through which fluid may flow into the ball housing 31 of the control valve 28 during normal operation. Likewise, the first valve recess 26 is an opening in the downstream end of the control valve 28 through which fluid may flow out of the ball housing 31 of the control valve 28 during normal operation. The ball housing 31 contains the ball 16, which has a smooth, spherical, solid structure. Alternatively, the ball 16 can have a hollow structure and may be made of other materials than those described above, such as glass or marble. During normal operation, fluid flows from the supply line through the second valve recess 30 into the ball housing 31, around the ball 16, and through the first valve recess 26 as the ball 16 is forced away from the first valve recess 26 by passive mechanical actuation of the retaining rod 14, which is typically provided by the particle dispenser (not shown), such as a sprinkler head, when it is connected to the riser with the retaining rod 14 in the riser 13.

In one variation, the ball 16 can have an oval, oblong or other suitable shape and surface texture that would allow the ball 16 to rest in the first or second valve recesses 26, 30 during an abnormal operation state so that fluid flow would be prevented through the first or second valve recesses 26, 30. That is, during an abnormal operation, such as when the riser 13 and the retaining rod 14 are broken and fluid is still flowing from the supply line, the fluid pressure forces the ball 16 against the first valve recess 30 thereby preventing fluid flowing pass the first valve recess 26. In the same abnormal operation state, but when the fluid is no longer flowing from the supply line, the ball 16 comes to rest on the second valve recess 30, as a result of the lack of fluid pressure, thereby preventing any fluid and contaminant (such as rocks, grass or other debris) back flowing through the second valve recess 30.

The first threaded end 15 is threaded internally (a female receptor) so that it may be connected to an externally threaded down-stream component, such as the riser 13, while the second threaded end 34 is threaded externally (a male receptor) so that it may be connected to an internally threaded up-stream component, such as a T or an elbow junction of the supply line (not shown). In one variation, the first threaded end 15 and second threaded end 34 can be both threaded externally, both threaded internally, one threaded internally and the other threaded externally, or one or both not threaded at all.

The riser 13 has an upstream end and a downstream end through which fluids may flow through during operation. The riser 13 has an elongated, cylindrical structure, much like a pipe, that is comprised of threaded segments 21, which are each threaded on its external surface. The riser 13 also has a base 21a and a top 21b. The threaded segments 21 are each slightly tapered from its base 21a to its top 21b, i.e., the base has a wider outer diameter than its top outer diameter. In this implementation there are eight threaded segments 21 with seven of the threaded segments formed in the same direction, while one of the threaded segments (e.g., the base or upstream threaded segment that is connected to the first threaded end 15 of the control valve 28) is formed in the opposite direction as the other seven threaded segments. The externally threaded slightly tapered external surface of each of the threaded segments 21 facilitates a tighter seal the deeper the upstream threaded segment 21 is screwed into the first threaded end 15 of the control valve 28 and the deeper the downstream threaded segment 21 is screwed into a particle dispenser (not shown), such as a sprinkler head, that has an internally threaded female receptor. Alternatively, each of the threaded segments 21 can be threaded on its internal surface so that on the upstream end of the riser 13 it can be connected to a control valve having a first threaded end that is threaded externally (male receptor) and on the downstream end of the riser 13 it can be connected to a particle dispenser that has an externally threaded male receptor. Likewise, the first threaded segment 21 on the upstream end of the riser 13 can be threaded internally, while the remaining threaded segments 21 can be threaded externally, or vice versa.

The top 21b of the threaded segments 21 that are located between the threaded segments 21 that form the ends of the riser 13 also serves as a predetermined cutoff point 22 of the riser 13; one of which additionally serves as a breakaway point 24 of the riser 13. The predetermined cutoff points 22 are positions along the length of the riser 13, spaced apart by about 0.75 inches (although any other separation distance may be used), which may be used to size the riser 13 to a desired length during installation of the flow control device 10. Because the threaded segments 21 are slightly tapered from the base 21a to the top 21b, the riser 13 can be snapped or broken by hand when a certain amount of force is applied to a selected predetermined cutoff point 22. In this implementation, the predetermined cutoff points 22 are at the same location as the base 21a. In fact, the riser 13 will typically snap or break at the selected predetermined cutoff point 22 at which force is applied. As a result, special tools, such as a hack saw, are not required to size the riser 13.

The breakaway point 24, on the other hand, is a point along the length of riser 13, typically located at the top 21b of the second threaded segment 21 from the upstream end of the riser 13, which will break during operation of the flow control device 10 when a force equal to or lower than the force required at the predetermined cutoff points 22 is applied to the riser 13. The breakaway point 24 can be formed by using less material at the break away point 24 of the riser 13. While the riser 13 is shown to have a single breakaway point 24, more than one breakaway point can be implemented. In fact, the breakaway point 24 can correspond to one or more of the predetermined cutoff points 22. In another variation, the breakaway point 24 can be formed using a material different from the rest of the riser 13 so as to make the breakaway point 24 possess qualities and characteristics that allows the breakaway point 24 to break away at a lower applied force during operation than the rest of the riser 13 including the predetermined cutoff points 22. Alternatively, the breakaway point 24 can be formed using a specific geometry. For example, a dimple, a debit, a crevice, or other suitable geometric shapes can be implemented to allow the breakaway point 24 to break at a lower applied force.

The riser 13 may be made of a certain color to permit ease of detection of a broken riser 13 from a far distance. For example, the riser 13 may be made of a neon color, such as bright orange or yellow or some other easily noticeable color, so that a maintenance or landscape worker may easily notice a broken riser from a distance. Additionally, the riser 13 may be made of a standardized color which indicates a particular use. For example, the riser may be made of a purple material to indicate that it is for use with reclaimed water (e.g., non-potable water) irrigation systems.

The retaining rod 14 includes a first end 39, a second end 18, and predetermined cutoff points 20. In this implementation, the number of predetermined cutoff points 20 on the retaining rod 14 correspond to the number of predetermined cutoff points 22 on the riser 13. Similarly, the predetermined cutoff points 20 of the retaining rod 14 are spaced apart the same distance as the predetermined cutoff points 22 of the riser 13, and are designed to be snapped or broken by hand when a certain amount of force is applied. The predetermined cutoff points 20 of the retaining rod 14 are offset (e.g., about a ¼ inch) vertically from the predetermined cutoff points 22 of the riser 13 when the retaining rod 14 is inserted into the riser 13 so that the first end 39 (i.e., the upstream end) extends into the ball housing 31. The correspondence between the cutoff points 22 of the riser 13 and the cutoff points 20 of the retaining rod 14 enables a person that is installing the device 10 to readily and quickly adjust the riser 13 length and retaining rod 14 length. For example, if the first three threaded segments 21 from the downstream end of the retaining rod 14 are snapped off during installation, then a corresponding number of segments from the first end 39 of the riser 13 needs to be snapped off during installation for proper operation of the flow control device 10. The retaining rod 14 is held in place within the riser 13 by a second end 18, which has a diameter that is bigger than the inner diameter of the riser 13, but the same or smaller than the outer diameter of the riser 13. Moreover, when a particle dispenser (e.g., a sprinkler head, a fire hydrant valve, a gas nozzle, and other suitable dispenser for dispensing particles such as water and gas) is connected to the downstream threaded end of the riser 13, the second end 18 of the retaining rod 14 is mechanically engaged and held in place between the particle dispenser and the downstream end of the riser 13. Additionally, a thin rubber washer, that has the same diameter as the second end 18 may be glued to the second end 18 to prevent fluids leaking at the connection between the particle dispenser and downstream end of the riser 13.

After the particle dispenser is connected to the downstream end of the riser 13 and the second threaded end 34 is connected to a supply line, when fluid is flowing during operation, the flow of fluid follows a path that starts from the supply line and passes through the control valve 28 and then the riser 13 before exiting through the particle dispenser. Specifically, when fluid flows into the ball housing 31, the fluid pressure pushes the ball 16 from the second valve recess 30 and against the first end 39 of the retaining rod 17, which prevents the ball 16 from being pushed against the first valve recess 26. Thus, fluid is then able to flow freely through the first valve recess 26.

Figure 2:
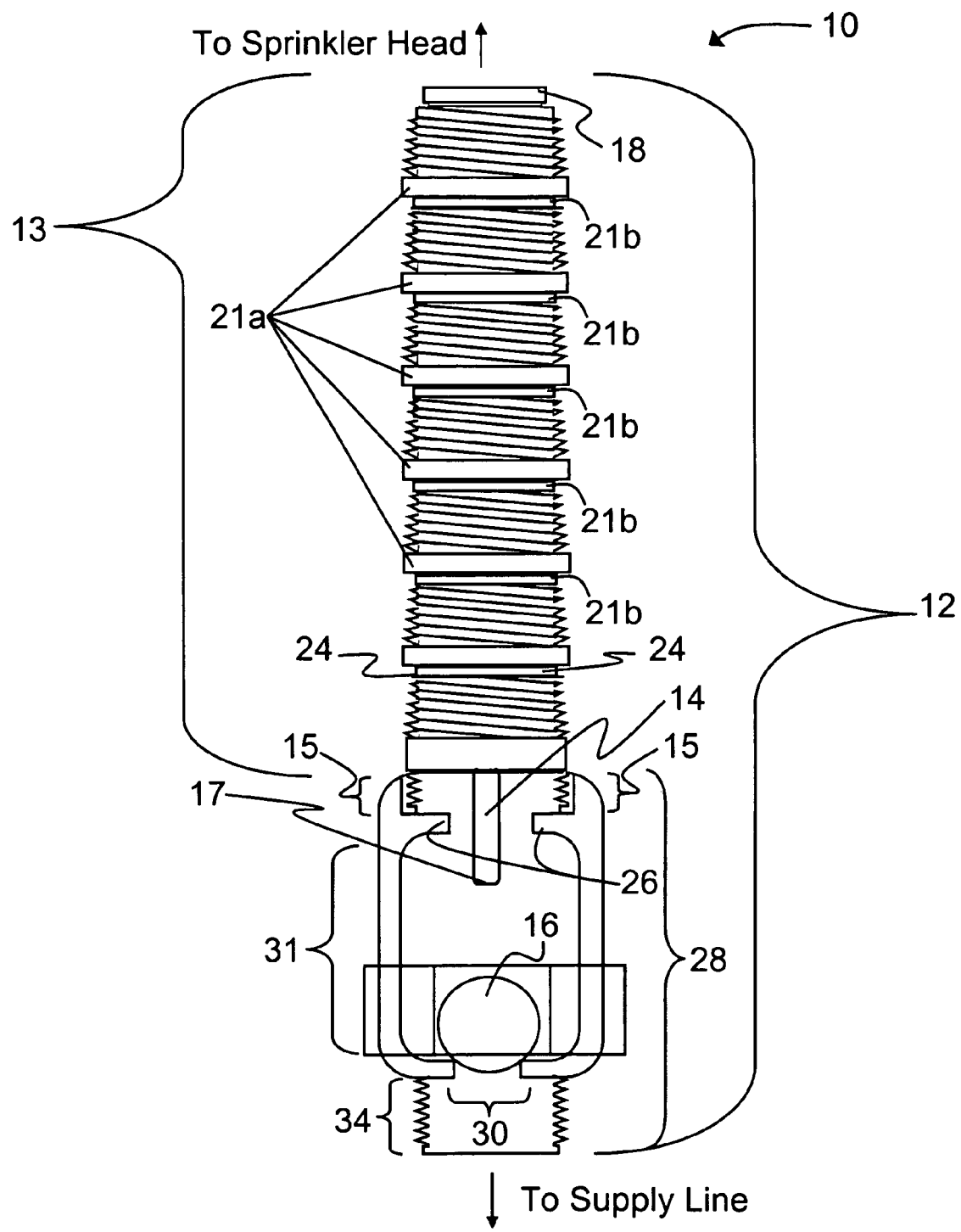
FIG. 2 illustrates a cross-sectional view of a flow control device and depicts an external view of a riser of the flow control device.

FIG. 2 shows a cross-sectional view of the flow control device 10 and an external view of the riser 13 of the flow control device 10. Here, the flow control device 10 comprises a control valve 28, a riser 13 and a retaining rod 14. The riser 13 is the same as in FIG. 1. However, in this perspective, the externally threaded surface of the threaded segments 21 of the riser 13 can be seen, which facilitates connection of the upstream end of the riser 13 to the first threaded end 15 of the control valve 28 and of the down-stream end of the riser 13 to a particle dispenser (not shown), such as a sprinkler head, that has an internally threaded female receptor. Each threaded segment 21 has multiple threads (or ribs) 32—in this implementation there are ten threads. In other implementations fewer or more threads may be used depending on design constraints.

FIGS. 3A,B show a side view and a top view of a retaining rod 14, which includes a first end 39, a body 23, predetermined cutoff points 20, connecting members 38, and second end 18. The first end 39 is part of the body 23 and its bottom surface is flat. When the retaining rod 14 is inserted into a riser 13 of a flow control device 10, the first end 39 engages the ball 16 during fluid flow. The predetermined cutoff points 20 are spaced along the length of the body 23, which has an elongated, cylindrical structure, at equal distances, such as a ¾ inch spacing. As noted previously, the predetermined cutoff points 20 may be used to size the retaining rod 14 to a desired length during installation of the flow control device 10. The connecting members 38, on one end, are attached to downstream end of the body 23, and on the other end, are attached to the second end 18, which has an opening 36. Thus, the connecting members 38 form a conical support framework that both attaches the second end 18 to the body 23 and keeps the body 23 of the retaining rod 14 centered in the riser 13 (not shown) of the flow control device 10 (not shown). In this implementation there are four connecting members 38, but in other variations more or fewer connecting members may be used. The second end 18 has a diameter that is between the outer and inner diameter of a corresponding riser 13 (not shown) so that the second end 18 may fit on top of the downstream end of the riser 13. The opening 36 permits fluids to flow through and into an attached particle dispenser when the retaining rod 14 is installed into a flow control device.

In one variation, the first end 39 can be formed to have a concave shape so that that the first end 39 can securely engage the ball 39 during operation of the flow control device. Alternatively, the first end 39 can be rounded. In yet another variation, the first end 39 can be formed to have a basket-like shape similar to the conical support framework of the connecting members 38, a convex shape or any other shape that is suitable to engage the shape of the ball 16. Additionally, as noted previously, a thin rubber washer, e.g., ⅛ inch thick, that has the same outer diameter as the second end 18 and an opening that has the same diameter as opening 36 of the second end 18 may be glued to the second end 18 to prevent fluids leaking at the connection between the particle dispenser and downstream end of the riser 13.

FIGS. 4A-D depict various views of an externally threaded riser 13 of a flow control device. FIG. 4A illustrates a side view of an externally threaded riser 13. FIG. 4B illustrates a cross-sectional view of the externally threaded riser 13 along section A-A as seen in the top view of the externally threaded riser 13 in FIG. 4C. FIG. 4D illustrates a blow up of a threaded segment 21 (detail B of FIG. 4A). As noted previously, the externally threaded riser 13 is comprised of multiple threaded segments 21. Each threaded segment has a base 21a and a top 21b, and have external sidewalls that are slightly tapered from the base 21a to the top 21b, i.e., the base has a wider outer diameter than its top outer diameter. In this implementation there are eight threaded segments—seven of the threaded segments are formed in the same direction, while one of the threaded segments (labeled as 21x) is formed in the opposite direction as the other seven threaded segments. The top 21b of the threaded segments 21 that are located between the threaded segments 21 that form the ends of the riser 13 also serves as the predetermined cutoff point 22 of the riser 13; one of which additionally serves as the breakaway point 24 of the riser 13. In other implementations, the riser can comprise more than one threaded segment 21x and more or fewer threaded segments 21.

Figure 5C:
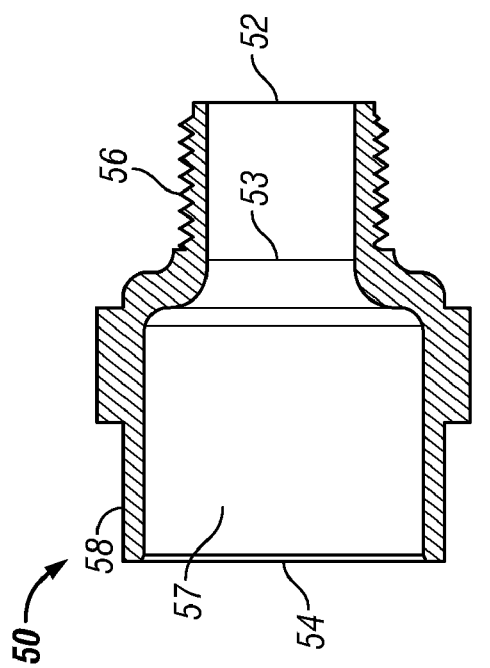
FIGS. 5A-D depict various views a control valve which comprises a control valve base and a control valve top.
Figure 5B:
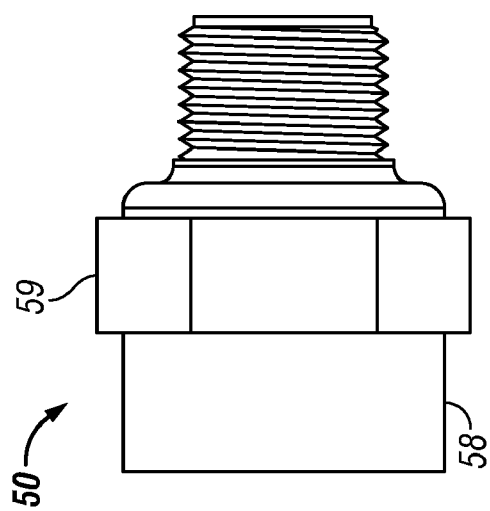
Figure 5A:
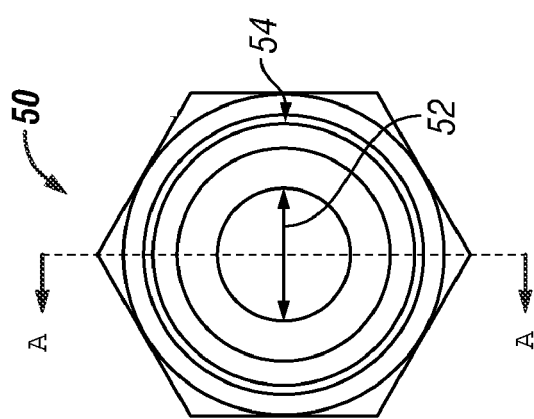
Figure 5D:
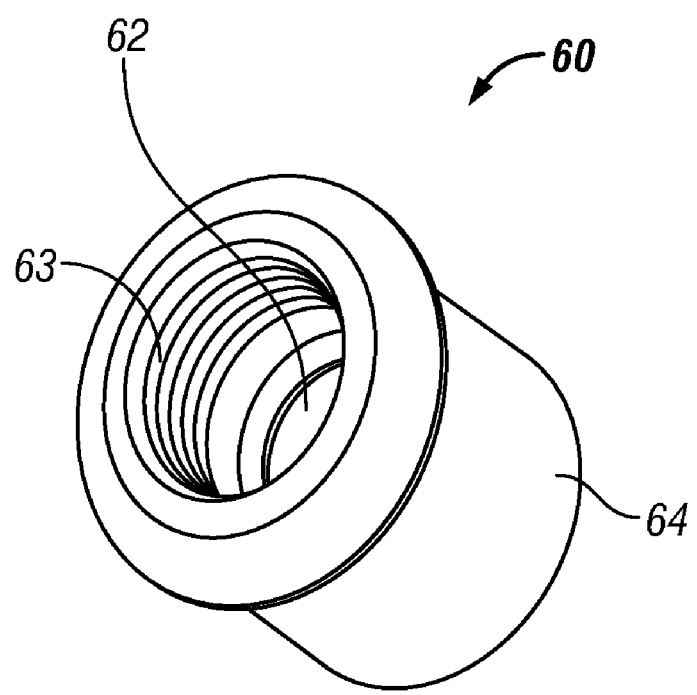

FIGS. 5A-D depict various views a control valve which comprises a control valve base 50 and a control valve top 60. A ball (not shown) is also part of the control valve. FIG. 5A illustrates a top view of the control valve base so, which has an upstream inner diameter 52 and a downstream inner diameter 54. The upstream inner diameter 52 is smaller than the downstream inner diameter 54. FIG. 5B illustrates an external side-view of the control valve base 50. As can be seen, the control valve base 50 has a second smooth end 58 and a second threaded end 56, which is threaded externally (a male receptor) so that it may be connected to an internally threaded up-stream component, such as a T or an elbow junction of a supply line (not shown). Between the second threaded end 56 and the second smooth end 58 is a six-sided portion, although more or fewer sides may be used, so that a user can grip the control valve base 50 easily, either by hand or with a wrench. FIG. 5C illustrates a cross-sectional view of the control valve base 50 along section A-A as seen in the top view of the control valve base 50 in FIG. 5A. As can be seen, the control valve base 50 has a second valve recess 53, which has an inner diameter as reflected by the downstream inner diameter 52 of FIG. 5A, and the second smooth end 58 has an inner diameter as reflected by the downstream inner diameter 54. FIG. 5D illustrates the control valve top 60 having a first threaded end 63 and a first smooth end 64. The first threaded end 63 is threaded internally (a female receptor) so that it may be connected to an externally threaded down-stream component, such as a riser 13 (not shown). The first smooth end 64 has an outer diameter that is smaller than the downstream inner diameter 54 of the control valve base 50. The control valve base 60 has a first valve recess 62, which has an inner diameter that can be the same as the inner diameter 52.

An adhesive may be applied to the external surface of the first smooth end 64 so that when the first smooth end 64 is connected to the second smooth end 58, a fluid tight seal may be obtained. A ball (not shown), however, is placed within the housing 57 before the first smooth end 64 of the control valve top 60 is connected to the second smooth end 58 of the control valve bottom 50 to form the control valve. The first valve recess 62 is an opening in the downstream end of the control valve through which fluid may flow out of during normal operation. Similarly, the second valve recess 53 is an opening in the upstream end of the control valve base 50 through which fluid may flow into the housing 57 of the control valve base 50. In one variation, the first threaded end 63 and second threaded end 56 can be both threaded externally, both threaded internally, one threaded internally and the other threaded externally, or one or both not threaded at all.

Figure 6:
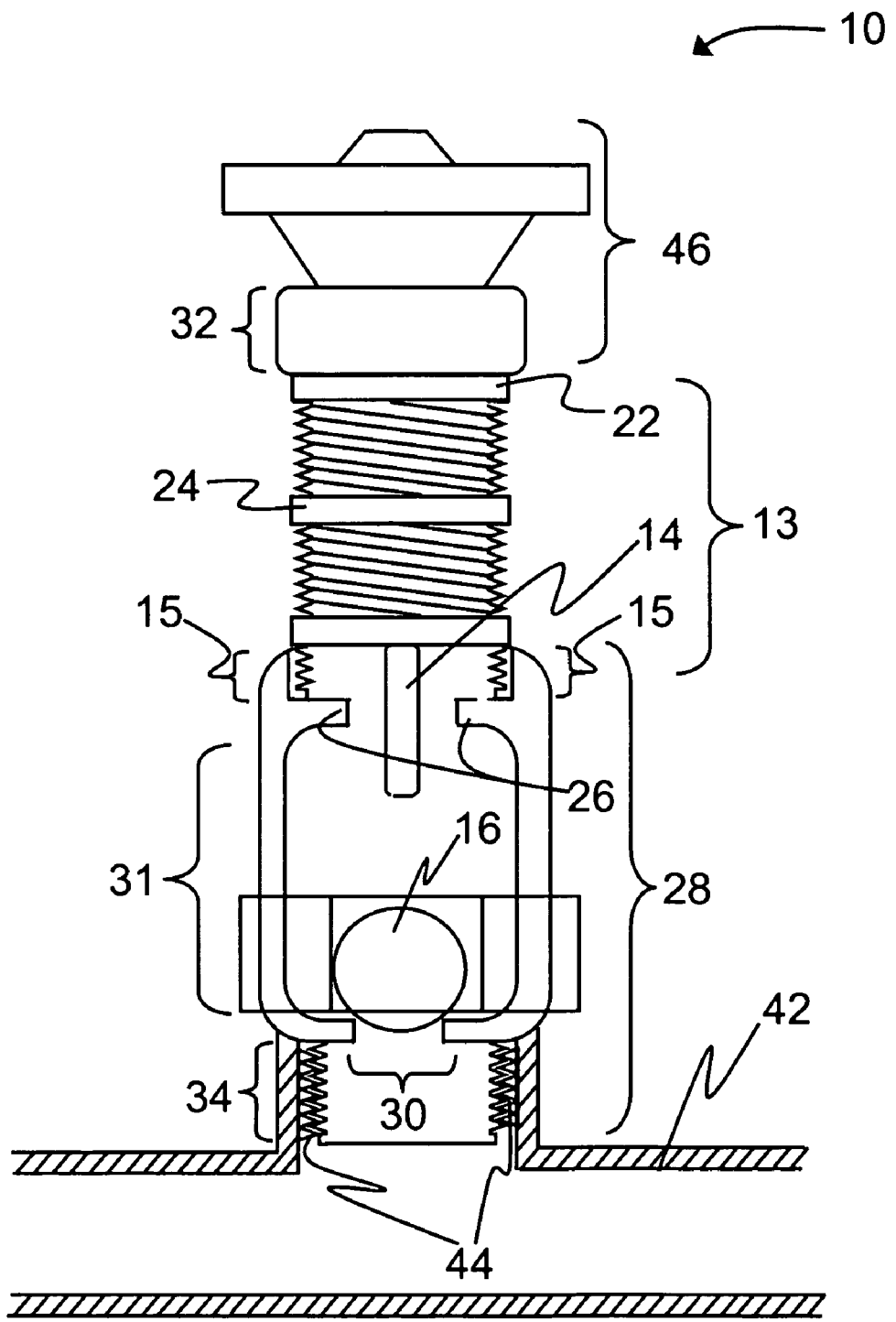
FIG. 6 illustrates a flow control device connected to a particle dispenser and a supply line.

FIG. 6 illustrates a flow control device 10 connected to a particle dispenser 46, such as a sprinkler head, and a supply line 42. The flow control device 10 includes a control valve 28, a riser 13 and a retaining rod 14. The second threaded end 34 (a male receptor) of the control valve 28 is connected to the supply line 42 via a threaded portion 44 (a female receptor) of the supply line 42. Similarly, the particle dispenser 46 has a threaded portion (a female receptor) (not shown) that is connected a threaded portion 32 of the riser 13.

Figure 7:
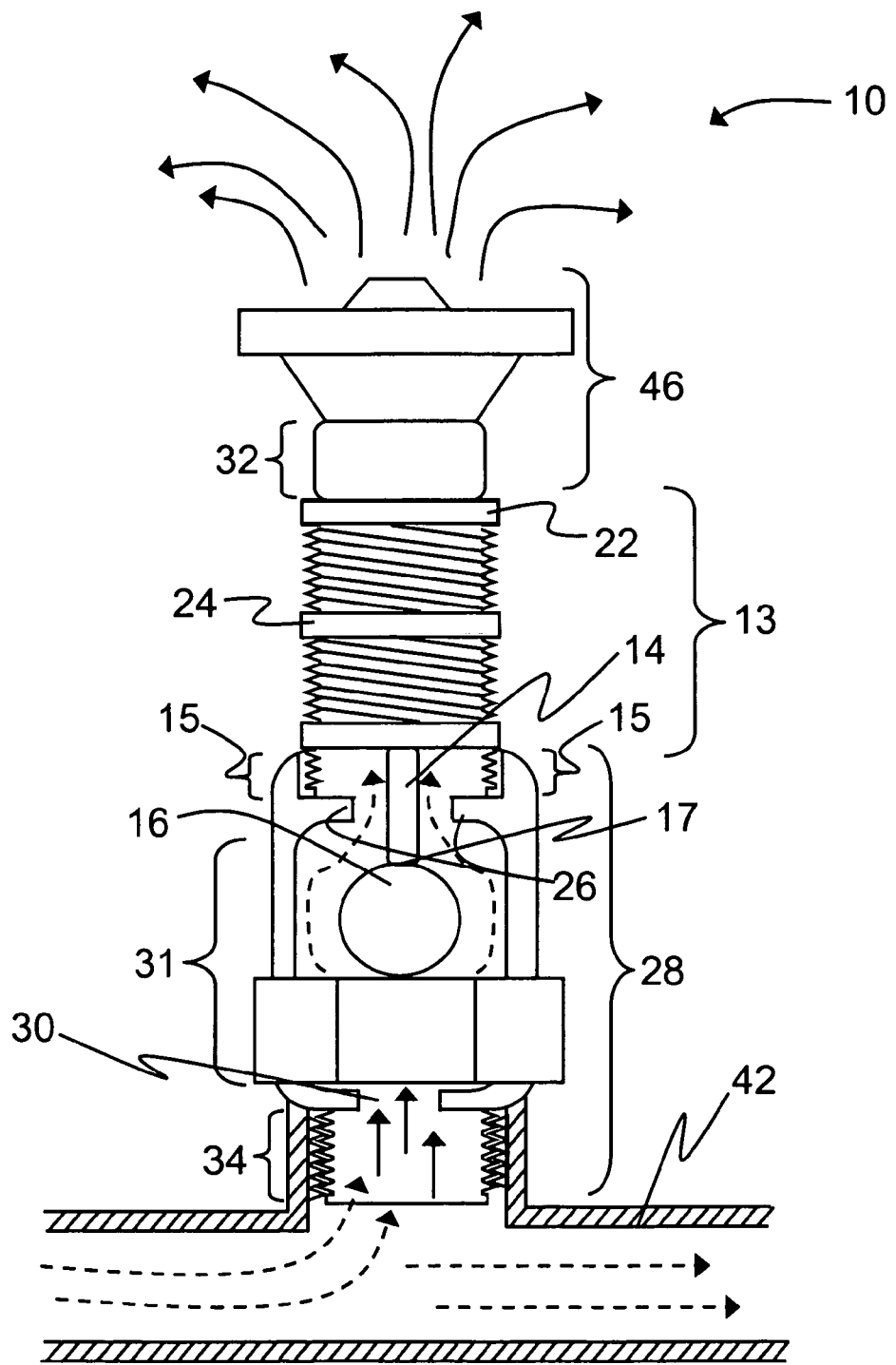
FIG. 7 illustrates the operation of a flow control device connected to a particle dispenser and a supply like in a normal operation state during fluid flow.

FIG. 7 illustrates the operation of a flow control device 10 connected to a particle dispenser 46, such as a sprinkler head, and a supply line 42 in a normal operation state during fluid flow. The flow control device 10 is connected between a particle dispenser 46 and a supply line 42. With the retaining rod 14 in place so that the first end 17 of the retaining rod 14 extends through the first valve recess 26 into the ball housing 31, fluid may flow from the supply line 42 through the second valve recess 30 into the ball housing 31, around the ball 16, through the first valve recess 26 and riser 13 and out through the particle dispenser head 46. Although the fluid pressure pushes the ball 16 away from the second valve recess 30 and towards the first valve recess 26, the first end 17 of the retaining rod 14 impedes movement of the ball onto the first valve recess 17 by passive mechanical actuation provided by the particle dispenser 46.

Figure 8:
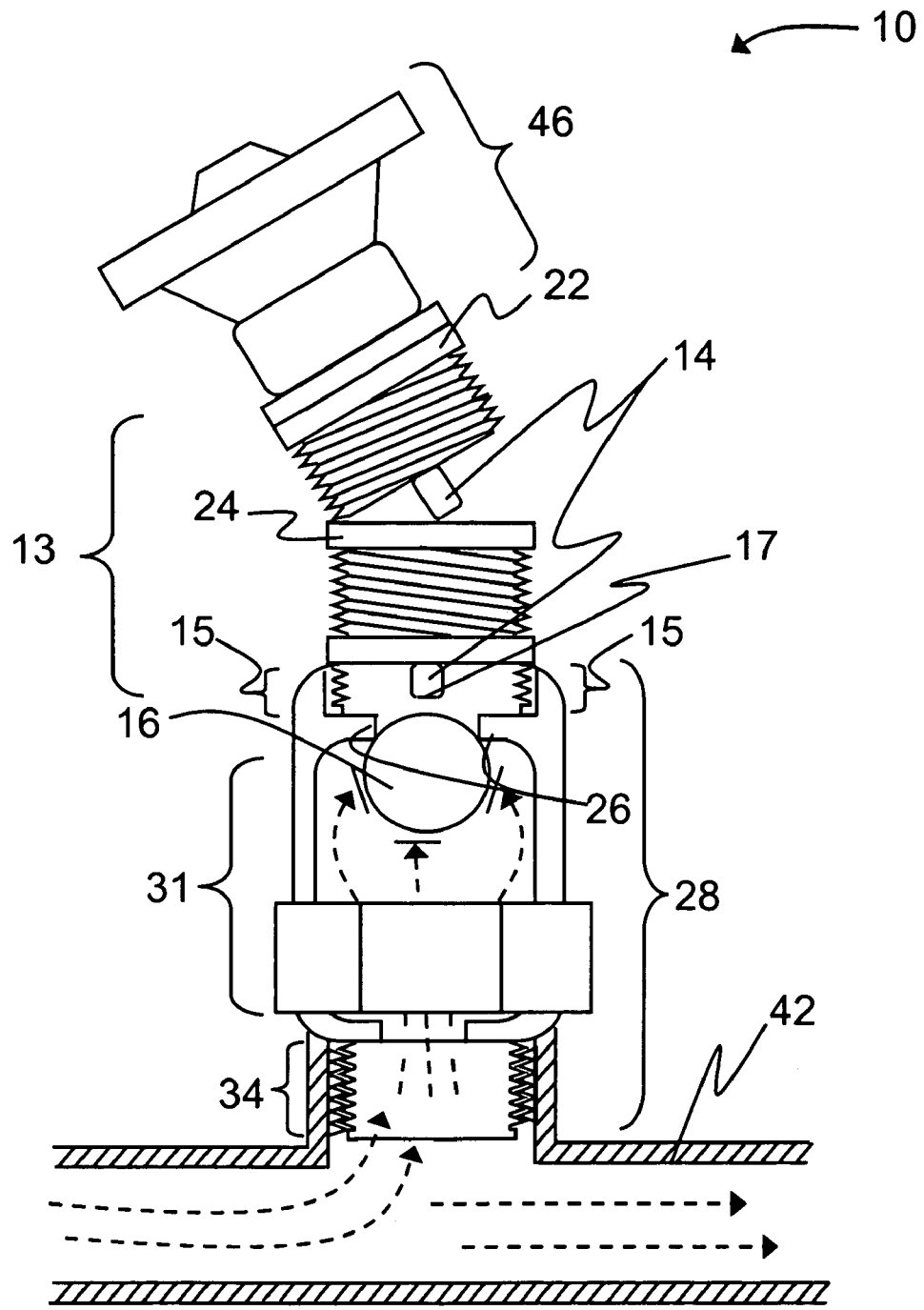
FIG. 8 illustrates the operation of a flow control device connected to a particle dispenser and a supply line in an abnormal operation state during fluid flow.

FIG. 8 illustrates the operation of a flow control device 10 connected to a particle dispenser 46 and a supply line 42 in a abnormal operation state during fluid flow. Typically, an abnormal operation state occurs when the riser 13 and the retaining rod 14 are broken or snapped off or the particle dispenser 46 is removed and fluid is still flowing from the supply line. In this implementation, the riser 13 is depicted broken at the breakaway point 24. The retaining rod 14 is also shown broken. In this implementation, the fluid pressure forces the ball 16 against the first end 17 of the retaining rod 14, which causes the retaining rod 14 to be pushed out of the ball housing 31 since there is no longer any passive mechanical actuation provided by the particle dispenser 46. Thus, without the retaining rod 14 to impede movement, the fluid pressure causes the ball 16 to be seated in the first valve recess 26 thereby stopping fluid flow into the riser 13. As a result, fluid flow has been stopped and potential damage to the surround area has been reduced or eliminated. Additionally, when fluid is no longer flowing from the supply line, the ball 16 comes to rest on the second valve recess 30, as a result of the lack of fluid pressure, thereby preventing any fluid and contaminant (such as rocks, grass or other debris) back flowing through the second valve recess 30 into the supply line 42.

The subject matter described herein has been described with respect to implementation in an irrigation system. However, the subject matter described herein may be used in other suitable applications, such as potable water distribution systems, gas distribution systems, petroleum distribution systems, fire sprinkler and fire hydrant systems, and the like. Moreover, as noted above, the flow control device 10 can be manufactured using various materials and combinations of materials appropriate for a particular application. For example, in an irrigation system, the flow control device 10 can be manufactured using a plastic material, such as PVC, CPVC, or PEX. In a fire sprinkler system, a flow control device 10 can be manufactured using fire retardant or fireproof materials, such as brass, copper, chrome, nickel, or various metal alloys in addition to PVC, CPVC and PEX. In a fire hydrant application, a flow control device 10 can be manufactured using any of the materials mentioned above or other suitable materials, which comply with local or national fire codes.

Additionally, although a few implementations and variations of the subject matter have been described in detail above, other interrelated implementations, modifications and variations are possible. For example, the particle dispenser, flow control device and supply line can be placed in various configurations with respect to each other. For example, the supply line can be installed above ground or the ceiling of a room, while the flow control device is connected to the supply line but placed below the supply line. This configuration is similar to a fire sprinkler system. Similarly, the supply line can be installed vertically from the ground or ceiling with the flow control device and particle dispenser extending sideways (or perpendicular) from the supply line. Accordingly, other implementations are within the disclosure and the following claims.

What is claimed is:

1. A flow control device comprising:
   a riser having a first end and a second end, wherein between the first end and the second end are disposed a plurality of threaded segments, each threaded segment having a top, a base, a predetermined inner diameter and a predetermined outer diameter, wherein the predetermined inner diameter is substantially the same from the base of the threaded segment to the top of the threaded segment, and the predetermined outer diameter is wider at the base of the threaded segment than at the top of the threaded segment, further wherein the plurality of threaded segments, together, form a length of the riser, further wherein, the riser comprises a predetermined riser cut-off points spaced between the threaded segments to adjust a length of the riser;
   a control valve having a first threaded valve end for detachably connecting to the first end of the riser, a second threaded valve end for detachably connecting to a supply line, and a ball housing between the first threaded valve end and the second threaded valve end, wherein the ball housing has a predetermined inner housing diameter;
   a ball enveloped inside the ball housing, wherein the ball has a diameter smaller than the predetermined inner housing diameter and larger than a first opening between the first threaded valve end and the ball housing and a second opening between the second threaded end and the ball housing; and
   a retaining rod, physically separate from the ball, having a first retaining rod end, a body having a plurality of predetermined retaining rod cut-off points spaced between a first body end and a second body end of the body for adjusting a length of the retaining rod, wherein the retaining rod cut-off points correspond to the riser cut-off points, a plurality of connecting members each having a first connecting member end and a second connecting member end, and a second retaining rod end shaped to form an opening, wherein the first retaining rod end is connected to the first body end, the second body end is connected to each first connecting member end, and each second connecting member end is connected to the second retaining rod end, further wherein the first end of the retaining rod is configured to be disposed inside the ball housing, a portion of the body of the retaining rod and the plurality of connecting members are configured to be disposed inside the riser, and the second end of the retaining rod is shaped to have a second retaining rod end diameter or width that is greater than the predetermined inner diameter of the riser and configured to be disposed external to the second end of the riser so as to physically prevent the ball from obstructing the first opening and prevent the second end of the retaining rod from entering the riser, and allows for the flow of fluid through the second end of the retaining rod, and the second end of the retaining rod does not impede the flow of the fluid through the riser, further wherein the body of the retaining rod consists of non-spring like segments separated by the retaining rod cut-off points.

2. The flow control device of claim 1, wherein the riser is configured to break at the one or more predetermined riser cut-off points under a force insufficient to break any other point of the riser.

3. The flow control device of claim 1, wherein the first end of the retaining rod has a first end diameter that is smaller than the predetermined inner housing diameter and the first and second opening.

4. The flow control device of claim 1, wherein the second end of the riser is configured to be detachably connected to one or more particle dispensers.

5. The flow control device of claim 4, wherein the particle dispenser is configured to stabilize the retaining rod inside the riser when connected to the second end of the riser.

6. The flow control device of claim 4, wherein the particle dispenser comprises at least one of a sprinkler head, a fire sprinkler head, a gas pump and a fire hydrant.

7. The flow control device of claim 1, wherein the ball housing is configured to allow the ball to freely move inside the ball housing.

8. The flow control device of claim 1, wherein the second threaded valve end is detachably connected to a fluid supply line so that during operation fluid flows from the fluid supply line into the ball housing and causes the ball to obstruct the first opening when the retaining rod is in a broken state or absent from the riser.

9. The flow control device of claim 8, wherein the ball obstructing the first opening prevents fluid flow through the first opening.

10. The flow control device of claim 1, wherein the second threaded valve end is detachably connected to a gas supply line so that during operation gas flows from the gas supply line into the ball housing and causes the ball to obstruct the first opening when the retaining rod is in a broken state or absent from the riser.

11. The flow control device of claim 10, wherein the ball obstructing the first opening prevents gas flow through the first opening.

12. The flow control device of claim 1, wherein the riser, the control valve, the retaining rod, and the ball are composed of one or more materials.

13. The flow control device of claim 1, wherein at least one of the riser, the control valve, the retaining rod, and the ball is composed of a material different from the others.

14. The flow control device of claim 12, wherein the one or more materials comprises a plastic material.

15. The flow control device of claim 14, wherein the plastic material comprises one of polyvinyl chloride (PVC), chlorinated polyvinyl chloride (CPVC), crossliniked polyethylene plastic (PEX), and acrylonitrile butadiene styrene (ABS).

16. The flow control device of claim 12, wherein the one or more material is compliant to a code or a regulation.

17. The flow control device of claim 12, wherein the one or more materials comprises a non-plastic material.

18. The flow control device of claim 1, wherein the riser is made of a color so as to permit ease of detection.

19. The flow control device of claim 18, wherein the color of the riser is one of orange, yellow and purple.

20. A method for automatically controlling particle flow through from a supply line through an opening using a flow control device, wherein the flow control device has a control valve with a first threaded valve end detachably connected to the supply line and a second threaded valve end, a riser having an upstream end detachably connected to the second threaded valve end and a downstream end, the riser comprising a predetermined riser cut-off points spaced between threaded segments to adjust a length of the riser, a retaining rod positioned within the riser with a first end positioned in a ball housing of the control valve and a second end mechanically engaged between the downstream end of the riser and a particle dispenser, the retaining rod comprising a body with retaining rod cut-off points correspond to the riser cut-off points, wherein the body of the retaining rod consists of non-spring like segments separated by the retaining rod cut-off points, further wherein the ball housing is integrally connected between the first threaded valve end and the second threaded valve end of the control valve and has a predetermined internal housing diameter, further wherein the ball housing encapsulates a ball, physically separate from the retaining rod, having a ball diameter smaller than the internal housing diameter and larger than a first opening between the first threaded valve end and the ball housing and a second opening between the second threaded valve end and the ball housing, the method comprising:

generating a particle flow;

receiving the generated particle flow at the first threaded valve end of the control valve; and permitting the received particle flow to pass through the second threaded valve end of the control valve during a normal operation; or automatically stopping the received particle flow from passing through the second threaded valve end of the control valve during an abnormal operation.

21. The method of claim 20, wherein the retaining rod comprises:

a first rod end having a first rod diameter that is less than the predetermined inner diameter of the riser, the internal housing diameter and the first and second openings; and a second rod end having a second rod diameter that is greater than the predetermined inner diameter and allows for the flow of fluid through the second end of the retaining rod.

22. The method of claim 21, wherein permitting the received particle flow to pass through the second threaded valve end of the control valve during a normal operation comprises:

moving the ball in the ball housing away from the first opening of the control valve towards the second opening of the control valve; and preventing the ball from obstructing the second opening of the control valve.

23. The method of claim 22, where preventing the ball from obstructing the second opening of the control valve comprises mechanically engaging the second end of the retaining rod between the downstream end of the riser and the particle dispenser so that the first end of the retaining rod remains rigidly within the ball housing of the control valve; and obstructing the ball towards the second opening of the control valve with the first end of the retaining rod.

24. The method of claim 23, wherein the particle dispenser comprises at least one of a sprinkler head, a fire sprinkler head, a gas pump and a fire hydrant.

25. The method of claim 21, wherein the riser and retaining rod are configured to breakaway at the one or more retaining rod breakaway points under a force insufficient to break the rest of the flow control device.

26. The method of claim 25, wherein the abnormal operation occurs when the retaining rod is broken or absent.

27. The method of claim 26, wherein automatically stopping the received particle flow from passing through the second threaded valve end of the control valve during an abnormal operation comprises moving the ball in the ball housing against the second opening of the control valve.

28. The method of claim 20 further comprising preventing backflow of particles from the riser into the supply line by applying the ball in the ball housing against the first opening of the control valve.

29. The method of claim 28, wherein the particle dispenser comprises at least one of a sprinkler head, a fire sprinkler head, a gas pump and a fire hydrant.

* * * * *

UNITED STATES PATENT AND TRADEMARK OFFICE
CERTIFICATE OF CORRECTION

PATENT NO. : 7,798,431 B2
APPLICATION NO. : 11/520207
DATED : September 21, 2010
INVENTOR(S) : Christopher J. Eader It is certified that error appears in the above-identified patent and that said Letters Patent is hereby corrected as shown below:

In Column 1, Line 14, delete "devices" and insert -- devices. --, therefor.

In Column 5, Line 5, delete "DESCRIPTION" and insert -- BRIEF DESCRIPTION --, therefor.

In Column 5, Line 40, delete "polypropolyene," and insert -- polypropylene, --, therefor.

In Column 5, Line 49, delete "ball 16" and insert -- ball 16, --, therefor.

In Column 9, Line 41, delete "so," and insert -- 50, --, therefor.

In Column 12, Line 33, in Claim 3, delete "opening." and insert -- openings. --, therefor.

In Column 13, Line 9, in Claim 15, delete "crossliniked" and insert -- crosslinked --, therefor.

In Column 14, Line 44, in Claim 28, delete "claim 20" and insert -- claim 20, --, therefor.

Signed and Sealed this
Twenty-eighth Day of June, 2011

David J. Kappos
*Director of the United States Patent and Trademark Office*